Oct. 8, 1940.  E. F. SPRENKLE  2,217,141
HYDRAULIC BRAKE CONTROL
Filed April 21, 1939   3 Sheets-Sheet 1

E. F. Sprenkle
INVENTOR.
BY
ATTORNEYS.

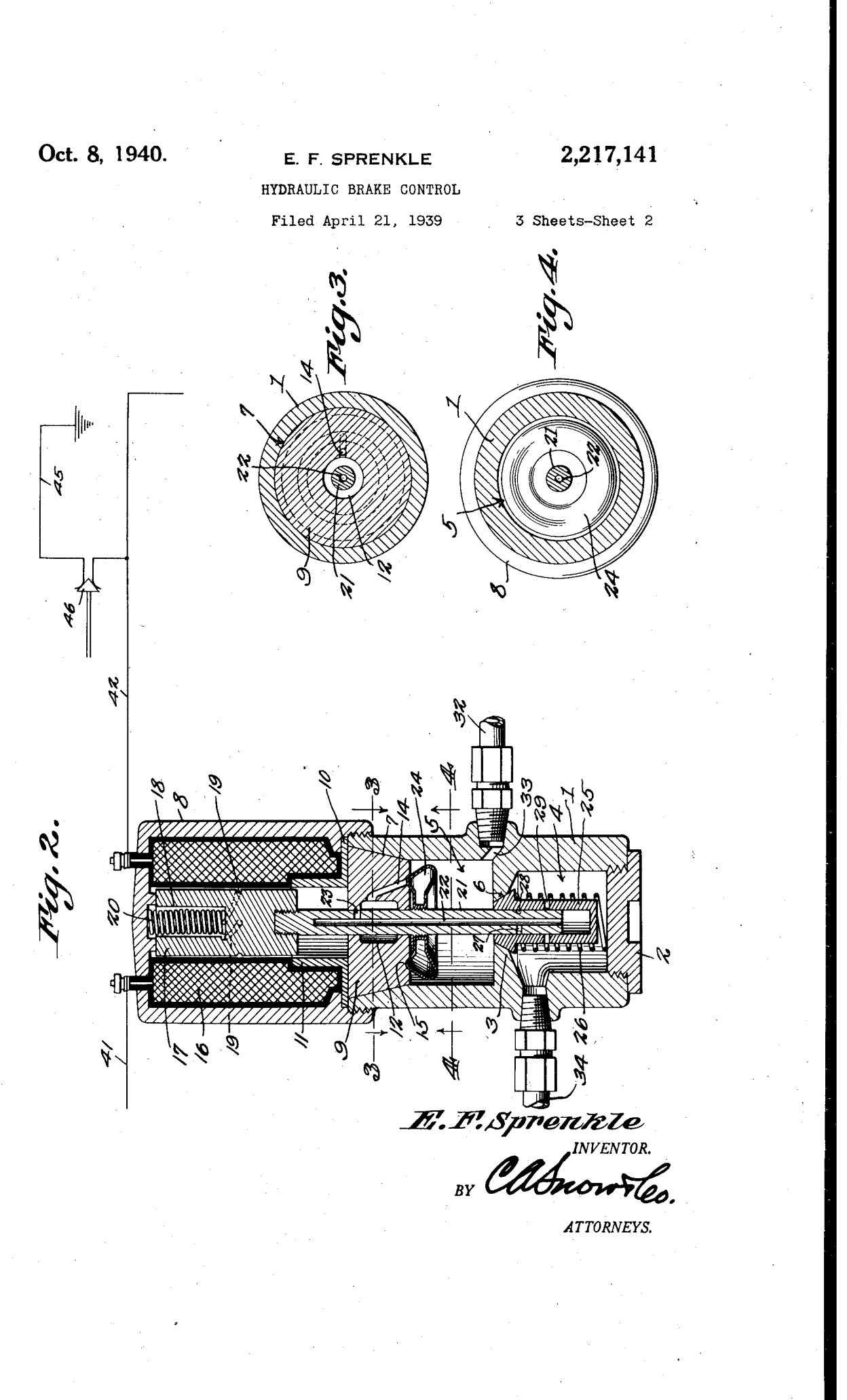

Oct. 8, 1940.  E. F. SPRENKLE  2,217,141

HYDRAULIC BRAKE CONTROL

Filed April 21, 1939  3 Sheets-Sheet 2

E. F. Sprenkle
INVENTOR.
BY C.A.Snow&Co.
ATTORNEYS.

Oct. 8, 1940.  E. F. SPRENKLE  2,217,141
HYDRAULIC BRAKE CONTROL
Filed April 21, 1939  3 Sheets-Sheet 3
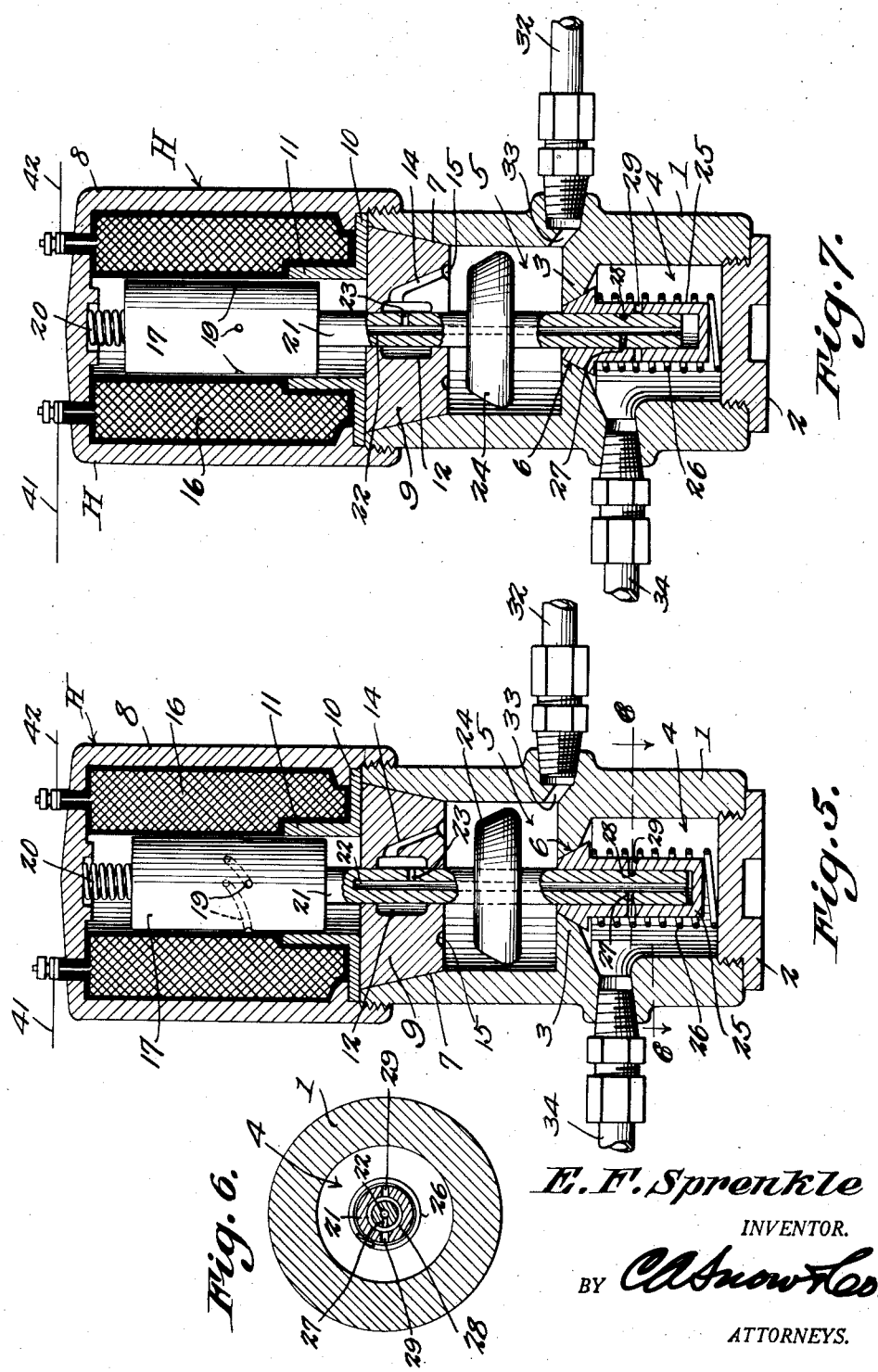
E. F. Sprenkle
INVENTOR.
BY
ATTORNEYS.

Patented Oct. 8, 1940

2,217,141

UNITED STATES PATENT OFFICE 2,217,141

HYDRAULIC BRAKE CONTROL

Everett F. Sprenkle, North East, Md.

Application April 21, 1939, Serial No. 269,198

8 Claims. (Cl. 192—13)

The objects of this invention are, to provide a simple valve structure whereby pressure may be retained in the brake tubes of the hydraulic brake system of a motor car, whereby the release of braking pressure may be retarded to give a time interval for clutch operation, and whereby advantage may be taken of the surge of brake fluid due to a sudden operation of the brake pedal, to apply the brakes with increased force. It is within the province of the disclosure to improve generally and to enhance the utility of devices of that type to which the present invention appertains.

With the above and other objects in view, which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

In the drawings:

Fig. 2 is a similar view showing the parts in position to retain pressure in the brake tubes;

Figure 1:
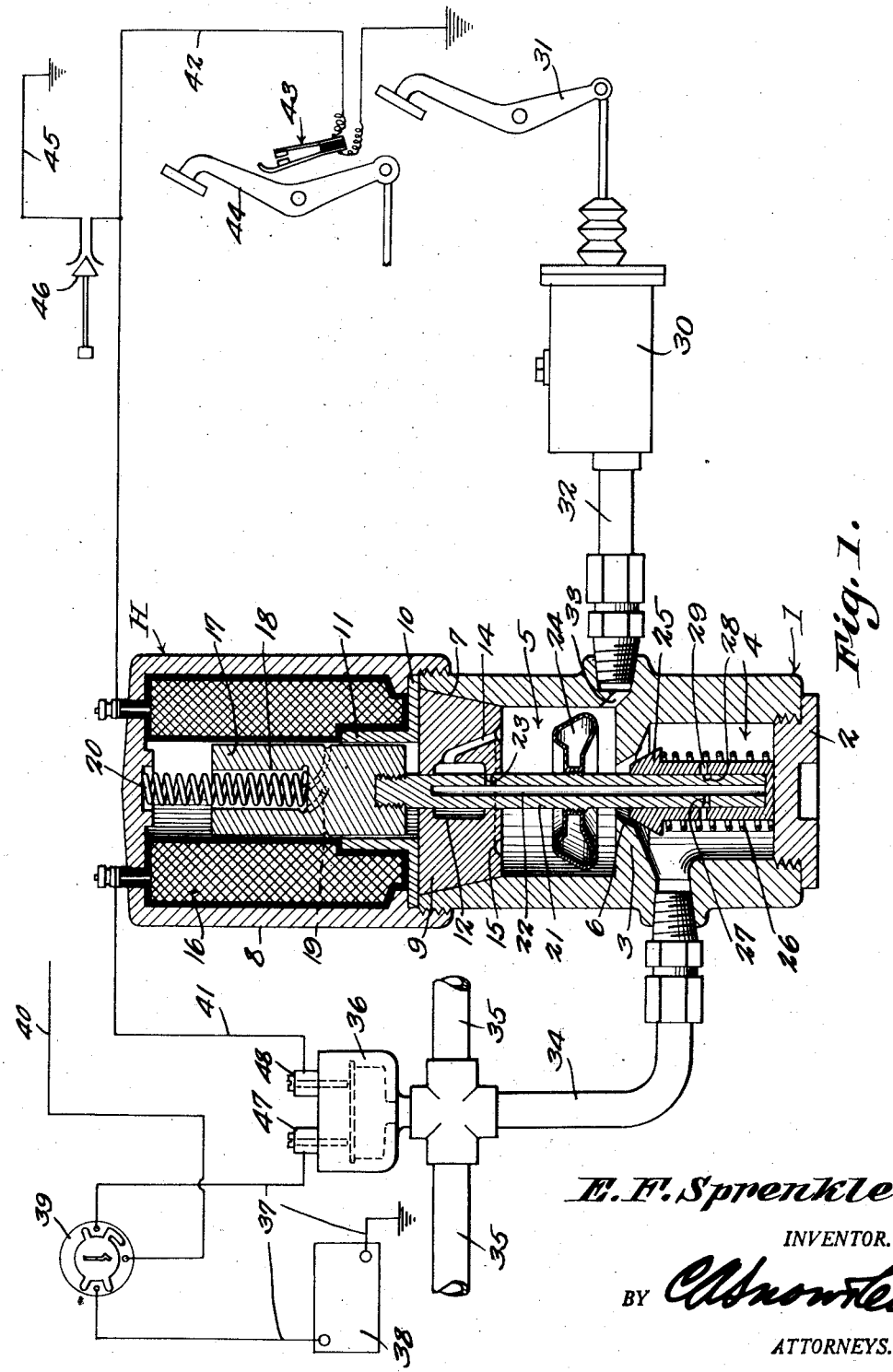
Fig. 1 is a sectional-diagrammatic view showing the parts in ordinary brake-operating position.

Figs. 3 and 4 are cross sections taken, respectively, on the lines 3—3 and 4—4 of Fig. 2;

Fig. 5 is a sectional-diagrammatic view showing the parts as they will appear when effecting a retarded brake-release;

Fig. 6 is a cross section on the line 6—6 of Fig. 5;

Fig. 7 is a sectional-diagrammatic view showing the parts as they will appear after surge-operation due to a sudden movement of the brake pedal.

In carrying out the invention, there is provided a housing H, which may be located in any accessible place on a motor car. For convenience in describing the relative locations of parts, it will be assumed that the housing H occupies the vertical position in Fig. 1 of the drawings, such words as "upper" and "lower" being selected accordingly.

The housing H includes a tubular base 1, provided at its lower end with a removable closure 2, the base being supplied with an intermediate transverse partition 3, defining a first compartment 4 and a second compartment 5. The partition 3 is provided with an upwardly tapered seat 6, and at its upper end, the base 1 has a tapered bore 7.

A cap 8 is detachably associated with the upper end of the base 1. A head 9 is shaped to fit in the bore 7 and is held therein by the pressure exerted by the cap 8 on the transverse lower flange 10 of a sleeve 11. The head 9 has an internal chamber 12, and from the chamber, a laterally extended and downwardly inclined duct 14 leads to an annular valve seat 15 found in the lower end of the head 9, communication thus being established, at times, between the chamber 12 and the second compartment 5.

A solenoid coil 16 is mounted in the cap 8, a minor lower portion of the solenoid coil being disposed about the sleeve 11, an armature 17 which is responsive to the coil 16 thus being enabled to operate with a short throw, and to be positioned properly with respect to the coil 16.

There is a recess 18 in the upper end of the armature 17. Spiral passages 19 are formed in the armature 17 and lead from the recess 18 to the outer surface of the armature. During the operation of the device, there is an interchange of fluid between the space above the armature and the space below it, the passages 19 providing for such an interchange. Moreover, since the passages 19 are of spiral form, a slight rotation is imparted to the armature 17, and the armature will not move with a right line reciprocation only, undesirable wear thus being prevented. The armature 17 is adapted to be moved downwardly by a first compression spring 20, finding an abutment at its upper end against the top of the cap 8, and engaged at its lower end, with the armature 17, within the recess 18.

The upper end of a stem 21 is connected to the armature 17. The stem 21 is mounted for sliding movement in the head 9, the chamber 12 in the head being disposed about a portion of the stem. The stem 21 has a small axial capillary bore 22, closed at its upper end, but open at its lower end. There is a lateral duct 23 in the stem 21, the duct communicating with the bore 22. At times, the duct 23 is in communication with the chamber 12 of the head 9, and at other times the duct is closed by the head.

A fluid vane of any desired construction, but preferably a hollow, concave-bottomed valve 24 is located in the second compartment 5 and is secured to the stem 21. The valve 24 is adapted to cooperate with the seat 15 in the lower surface of the head 9. The valve 24 has some resiliency, so as to afford a cushioning action as the valve is seated.

A valve 25 is disposed in the first compartment 4 and is closed at its lower end, the valve being adapted to open and close with respect to the seat 6 in the partition 3, the valve being slidably mounted on the armature stem 21. The valve 25 is urged upwardly upon the seat 6 through the instrumentality of a compression spring 26, abutting at its upper end against the head of the valve, and abutting at its lower end against the closure 2. The spring 20 is stronger than the spring 26. Within the valve 25, the armature stem 21 has a transverse port 27, in communication with the bore 22 and in communication with an external, annular groove 28 in the stem. The groove 28, at times, comes into communication with transverse ports 29 in the valve 25, those ports being in communication with the first compartment 4.

In Fig. 1, the numeral 30 marks a master brake cylinder, the piston of which is actuated by an operating member, such as a brake pedal 31. A pipe 32 establishes communication between the brake cylinder 30 and the second compartment 5, through a reduced, upwardly inclined passage 33 in the base 1 of the housing H. A pipe 34 is in communication with the first compartment 4, and leads to the brake tubes 35 controlling the mechanical braking mechanism, not shown, but well understood and forming no part of the present invention. The pipe 34 is in communication with a pressure actuated switch 36, of common and known construction.

A grounded conductor 37 is connected to one of the terminals 47 of the switch 36. In the conductor 37 is interposed a battery 38 or other source of electrical energy. A switch 39, under the control of an operator, is interposed in the conductor 37. The switch 39 controls an ignition circuit 40, and it controls, also, the flow of current through the conductor 37. The construction of the switch 39 is such that even though the ignition circuit 40 is open, the passage of current through the conductor 37 may continue. The switch 39 has no distinctively characteristic function in the operation of the brake mechanism, and may be dismissed without further discussion.

From the other terminal 48 of the pressure controlled switch 36, a conductor 41 leads to one end of the winding of the coil 16. From the other end of the winding of the coil 16, there leads a grounded conductor 42. A normally open switch 43 is interposed in the conductor 42, and is so located that it can be closed by a clutch pedal 44. A grounded conductor 45 is branched off from the conductor 42, and in the conductor 45 is interposed a switch 46, under the control of an operator and preferably located on the dashboard of an automobile. The clutch pedal 44 may not always be in use, to close the switch 43, and when that condition exists, a circuit may be established through the winding of the coil 16, by closing the switch 46.

Figure 1 of the drawings shows the parts as they will appear when the braking mechanism is released. The circuit through the coil 16 is open. The superior spring 20, overcoming the inferior spring 26, has moved the armature 17, its stem 21, and the valve 25 downwardly, until the valve 25 is open with respect to the seat 6, the duct 23 in the valve stem 21 being closed by and within the head 9.

There is a free and unencumbered conduit by which, under the impulse of the brake pedal 31, the fluid may pass from the master cylinder 30 to the brake tubes 35, that conduit including the pipe 32, the passage 33, the compartment 5, the seat 6, the compartment 4 and the pipe 34. The brakes, therefore, can be set and released in the usual manner.

Attention now is directed to Fig. 2, wherein the parts are in the positions that they will assume when it is desired to hold brake pressure in the tubes 35 of Fig. 1. By means of the switch 46 of Fig. 2, or by means of the switch 43 of Fig. 1, which is actuated by the clutch pedal 44, the circuit through the coil 16 has been closed. The armature 17, responding to the coil 16, has moved upwardly until the port 27 in the armature stem 21 has been closed by the valve 25, the valve 25 being closed upon the seat 6 by the operation of the spring 26. The valve 24 on the stem 21 has moved upwardly until it has engaged the seat 15 in the head 9, the duct 14 being closed. It may be noted here that the braking pressure in the tubes 35 of Fig. 1 is maintained by a triple seal, since the valves 24 and 25 are in closed position, and since the duct 23 in the stem 21 is closed by the head 9 and is not in communication with the chamber 12 of the head.

So soon as the circuit through the coil 16 is opened, either at the switch 46 or the switch 43, the spring 20, overcoming the action of the spring 26, restores the parts to the position of Fig. 1.

Under some conditions, for instance if the car is on a hill, it may be desirable to release the brake pressure in the tubes 35 gradually, so that there will be an interval during which the clutch may be thrown in. When the clutch pedal 44 is eased off, to throw in the clutch, the switch 43 is opened, the coil 16 is de-energized, and the armature 17, and parts associated with it move downwardly under the action of the spring 20, toward the position of Fig. 1. However, before the armature stem 21 picks up the valve 25 and opens it, the parts must pass through the intermediate position of Fig. 5. In that position, the port 27 in the armature stem 21, and the annular groove 28 of the stem, are in communication with the ports 29 of the valve 25, and the duct 23 in the valve stem 21 is in communication with the chamber 12. Under such circumstances, the brake pressure in the tubes 35 is reduced gradually through a conduit including the pipe 34, the first compartment 4, the ports 29 in the valve 25, the annular groove 28 in the armature stem 21, the port 27 in the armature stem, the capillary bore 22 of the stem, the duct 23 of the armature stem, the duct 14 in the head 9, the second compartment 5, the passage 33, and the pipe 32. An interval, therefore, is afforded, during which the clutch can be engaged. Ultimately, the armature stem 21, moving downwardly, passes the position of Fig. 5, picks up the valve 25, and moves it downwardly to the position of Fig. 1. The time interval during which the clutch can be thrown in, is regulated by the cross sectional area of the capillary duct 23 and associated openings, together with the viscosity or fluidity of the actuating liquid.

Under some conditions, for instance if an obstacle looms up suddenly in front of a car, the driver, subconsciously, will operate the brake pedal 31 with great force. As a result, a ramming effect, of high efficiency, is created in the brake tubes 35. Considering the showing of Fig. 1, and disregarding for the moment an operation that actually takes place, so soon as the brake pedal 31 is eased off, for the purpose of pumping up or otherwise, the potent ram in the brake tubes 35 is lost, due to back-flow to the master cylinder 30.

Figure 7 indicates a stage of operation in which the ram pressure in the brake tubes 35 is maintained. There is, necessarily, some lag in the upward movement of the armature 17, responsive to the coil 16, since it must oppose the effort of the spring 20 and also carry the weight of the stem 21 and the valve 24: or the operator may wish to leave the clutch thrown in, in order that he may have the braking drag of the engine, the switch 43 being open, and the coil 16 having no effect on the armature 17, to raise the armature and dispose the parts in the holding position of Fig. 2.

When the brake pedal 31 is operated suddenly, the high spasmodic pressure produced in the pipe 32 is directed upwardly through the passage 33 and creates a violent, lifting surge in the compartment 5, below the valve 24, the valve acting as a fluid vane, the valve rising to the position of Fig. 7, the valve 25 being freed from the downward thrust of the armature stem 21 (shown in Fig. 1), and the valve 25 then being permitted to move upwardly, under the action of the spring 26, in order to hold in the brake tubes 35, the increased ramming pressure obtained by an abrupt operation of the brake pedal 31.

The mechanism within the housing H is not of a complicated nature, but it produces the new and unexpected results hereinbefore attributed to it.

What is claimed is:

1. In a valve mechanism of the class described, a housing having communicating first and second compartments, the second compartment having a fluid pressure inlet, the first compartment having a fluid pressure outlet, a valve actuating means mounted to reciprocate in the housing, a valve in the first compartment and slidable on the actuating means, the valve controlling communication between the compartments, the actuating means engaging and opening the valve when the actuating means is advanced, and spring means for closing the valve when the actuating means is retracted.

2. In a valve mechanism of the class described, a housing having communicating first and second compartments, the second compartment having a fluid pressure inlet, the first compartment having a fluid pressure outlet, a valve actuating device mounted to reciprocate in the housing, a valve in the first compartment and slidable on the actuating device, the valve controlling communication between the compartments, spring means for advancing the valve actuating device to cause it to engage and open the valve, electro-mechanical means for retracting the valve actuating device, and spring means for closing the valve when the valve actuating device is retracted.

3. A valve mechanism of the class described, constructed as set forth in claim 1, and wherein there is a passage for brake fluid, leading from one compartment to the other, through the housing, through the valve actuating means, and through the valve, those portions of the passage which are in the housing and in the valve actuating means being so located with respect to each other that when the valve actuating means moves relatively to the housing, said portions will be out of registration, thereby to close the passage.

4. A valve mechanism of the class described, constructed as set forth in claim 2, and wherein there is a passage for brake fluid leading from one compartment to the other, through the housing, through the valve actuating means, and through the valve, and another valve, carried by the valve actuating means, said other valve being located in the second chamber and being surge-operated from the inlet, to close the passage.

5. A valve mechanism of the class described, constructed as set forth in claim 1, and wherein there is a passage for brake fluid leading from one compartment to the other, through the housing and through the valve actuating means, the valve and the valve actuating means having ports which come into registration and establish communication between the passage and the first compartment before the valve actuating means moves the valve to open position.

6. In a vehicle brake, a source of pressure, a brake conduit connected to said source, a slidably-mounted valve interposed in the conduit and opening and closing the conduit, spring means for closing the valve, a valve actuator engageable with the valve to open it, means under the control of an operator for operating the valve actuator, said source including an actuating member directly under the control of an operator, the valve actuator including a solenoid magnet and a magnet circuit, a clutch actuator, a switch in said circuit and located in the path of the clutch actuator, and a surge-operated means interposed in the conduit and closing the conduit independently of the valve actuator and the valve.

7. In a vehicle brake, a source of pressure, a brake conduit connected to said source, a slidably-mounted valve interposed in the conduit and opening and closing the conduit, spring means for closing the valve, a valve actuator engageable with the valve to open it, means under the control of an operator for operating the valve actuator, and a surge-operated means interposed in the conduit and closing the conduit independently of the valve actuator and the valve.

8. In a vehicle brake, a brake pressure conduit having a seat, a valve actuator, a valve cooperating with the seat to open and close the conduit, the valve being slidable on the actuator to closed position, spring means for closing the valve, the actuator engaging the valve to open the valve, there being a capillary by-pass passage located partly in the actuator and communicating with the conduit on opposite sides of the seat, the valve and the actuator having ports which come into registration and open the conduit before the valve has been opened by the actuator.

EVERETT F. SPRENKLE.